United States Patent Office 3,293,297
Patented Dec. 20, 1966

3,293,297
N-OXYALKYLATED-AMINEDIPHENYL-OXO- AND AMINO-COMPOUNDS
James J. Louvar, Evanston, Anthony J. Guarnaccio, Niles, and Ted Symon, Lombard, Ill., assignors to Universal Oil Products Company, Des Plaines, Ill., a corporation of Delaware
No Drawing. Original application Mar. 28, 1963, Ser. No. 268,561. Divided and this application July 30, 1964, Ser. No. 386,404
4 Claims. (Cl. 260—571)

This is a division of copending application Serial Number 268,561 filed March 28, 1963, and now abandoned, and relates to a novel composition of matter.

The novel composition of the present invention is particularly useful as an additive in the stabilization of polyolefins including polyethylene, polypropylene, polybutylene, copolymers of ethylene and propylene, copolymers of ethylene and butylene and copolymers of propylene and butylene, as well as polymers prepared from one or more higher molecular weight olefins. The polyolefins preferably are of high molecular weight, usually having a molecular weight above 1000 and extending into the hundreds of thousand range. The polyolefins may be of the high density, medium density or low density type. Polyethylene is utilized, for example, as a thermoplastic, molding or coating agent. Because of its high dielectric strength and its resistance to water, polyethylene is particularly advantageous for use as insulators or dielectrics in condensers and other similar electronic equipment. Polyethylene plastics also are used in many other applications. Polypropylene, polybutylene, and copolymers of ethylene, propylene and/or butylene also are used in electronic equipment, as well as in many other applications.

The novel additive of the present invention also is particularly useful in the stabilization of lubricants, including lubricating oils and greases. These may be either of synthetic or petroleum origin. The synthetic lubricating oils are of varied types including aliphatic esters, polyalkylene oxides, silicones, esters of phosphoric and silicic acids and highly fluorine-substituted hydrocarbons. Of the aliphatic esters, di-(2-ethyl-hexyl) sebacate is being used on a comparatively large commercial scale. Other aliphatic esters, include dialkyl azelates, dialkyl suberates, dialkyl pimelates, dialkyl adipates and dialkyl glutarates. Specific examples of these esters include dihexyl azelate, di-(2-ethylhexyl) azelate, di-3,5,5-trimethyl-hexyl glutarate, di-(2-ethylhexyl) pimelate, di-(2-ethylhexyl) adipate, triamyl tricarballylate, pentaerythritol tetracaproate, pentaerythritol tetrapelargonate, dipropylene glycol dipelargonate and 1,5-pentanediol-di-(2-ethylhexanoate). The polyalkylene oxides include polyisopropylene oxide, polyisopropylene oxide diether and polyisopropylene oxide diester. The silicones include methyl silicone, ethylphenyl silicone and the silicates include, for example, tetraisooctyl silicate. The highly fluorinated hydrocarbons include fluorinated oil and perfluorohydrocarbons.

Additional synthetic lubricating oils include (1) neopentyl glycol esters, in which the ester group contains from 3 to 12 carbon atoms or more, and particularly neopentyl glycol proprionate, neopentyl glycol butyrate, neopentyl glycol caproate, neopentyl glycol caprylate, neopentyl glycol pelargonate, (2) trialkylol alkane esters such as the esters of trimethylol alkanes including trimethylolethane, trimethylolpropane, trimethylolbutane, trimethylolpentane, trimethylol hexane, trimethylolheptane, trimethyloloctane, trimethylolnonane, trimethyloldecane, trimethylolundecane, trimethyloldodecane, and particularly triesters in which the ester portions each contain from 3 to 12 carbon atoms and may be selected from those hereinbefore specifically set forth in connection with the discussion of the neopentyl glycol esters, and (3) tricresylphosphate, trinonylphosphate, tridecylphosphate, triphenylphosphate, as well as mixed aryl and alkyl phosphates.

The lubricating oils of petroleum origin include those referred to as motor lubricating oil, railroad type lubricating oil, marine oil, transformer oil, turbine oil, transmission oil, differential oil, diesel lubricating oil, gear oil, cutting oil, rolling oil, cylinder oil, hydraulic oil, slushing oil and specialty products oil.

The synthetic greases generally are referred to as lithium base grease, sodium base grease, calcium base grease, barium base grease, strontium base grease and aluminum base grease. These greases are solid or semi-solid gels and, in general, are prepared by the addition to mineral or synthetic oils of hydrocarbon-soluble metal soaps or salts of higher fatty acids as, for example, lithium streate, calcium stearate and aluminum naphthenate. The grease may contain thickening agents such as silica, carbon black, polyacrylates and talc. Another type of grease is prepared from oxidized petroleum wax, to which the saponifiable base is combined with the proper amount of the desired saponifying agent, and the resultant mixgreases in which the features of the present invention are usable include petroleum grease, whale grease, wool grease, and those made from inedible fats, tallow, and butcher's waste.

The novel additive also is useful in the stabilization of fatty materials including the stabilization of edible fats and oils, which may be of animal, vegetable or mineral origin and which tend to become rancid, especially during long periods of storage prior to use. Typical representatives of edible fats and oils include linseed oil, menhaden oil, cod liver oil, castor oil, olive rapeseed oil, coconut oil, palm oil, corn oil, sesame oil, peanut oil, butter, fat, lard and beef. It is understood that other oils and fats may be treated within the scope of the present invention, including oils and fats which previously have been subjected to various treatments, such as blowing with air, heat treatment and hydrogenation. In another embodiment the novel additive of the present invention may be used in the treatment of crops by dusting or spraying in order to preserve food accessory factors such as carotene, vitamins, various fatty acids and alcohols.

Other organic substances which deteriorate in storage, during transportation and/or in use, include hydrocarbons and particularly motor fuels such as saturated and particularly unsaturated gasoline, blends of unsaturated and saturated gasolines, including cracked gasoline, straight run gasoline, polymer gasoline, coker gasoline, alkylate, as well as jet fuel, diesel oil, mineral oil, fuel oil, residual oil, drying oil, waxes, resins, and rubber which may be natural or synthetic. These substances are adversely affected by oxygen, with the resultant formation of undesirable gum, discoloration and/or other deleterious reaction products.

In one embodiment the present invention relates to a method of stabilizing an organic substance normally subject to oxidative deterioration which comprises incorporating therein a stabilizing concentration of an inhibitor selected from the group consisting of N-oxyalkylenated-aminodiphenylamine, N - oxyalkylenated - aminodiphenylalkane, N-oxyalkylenated-aminodiphenyl ether and N-oxyalkylented-aminodiphenyl sulfide.

In a specific embodiment the present invention relates to a method of stabilizing polyethylene against oxidative deterioration which comprises incorporating therein a stabilizing concentration of N-oxyethylenated-4-aminodiphenylamine inhibitor.

In another specific embodiment the present invention relates to a method of stabilizing lubricating grease against oxidative deterioration which comprises incorporating therein a stabilizing concentration of N,N'-di-(oxypropylenated)-4,4'-diaminodiphenylmethane inhibitor.

In another embodiment the present invention relates to an organic substance, particularly polyolefin, lubricating oil and grease, containing a stabilizing concentration of the novel additive of the present invention.

It is believed that the novel additives of the present invention are new compositions of matter and may be represented by the following general formula:

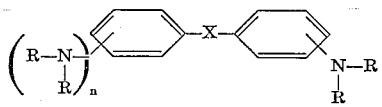

in which X is selected from the group consisting of oxygen, sulfur and nitrogen, R is selected from the group consisting of hydrogen, hydroxyalkyl, hydroxyalkoxyalkyl or mixtures thereof, at least one R being hydroxyalkyl or hydroxyalkoxyalkyl where the hydroxyalkyl contains from 2 to 6 carbon atoms and the hydroxyalkoxyalkyl contains from 4 to 12 carbon atoms, and $n$ is an integer of from 0 to 1.

Although the oxyalkylenated products of the present invention generally will predominate in a specific chemical compound, the products may comprise a mixture of different chemical compounds for the reasons which will be hereinafter more fully described. Accordingly, these products are best defined by the nomenclature of N-oxyalkylenated-aminodiphenyl compounds and more specifically N-oxyalkylenated-aminodiphenyl-amines, alkanes, ethers and sulfides.

As hereinbefore set forth, the novel additive of the present invention is an N-oxyalkylenated-aminodiphenyl compound including the N-oxyalkylenated-monoaminodiphenyl compound, N-oxyalkylenated-polyaminodiphenyl compound and particularly N-oxyalkylenated-diaminodiphenyl compound. Oxyalkylenation of the aminodiphenyl compound is readily effected by reacting the aminodiphenyl compound with alkylene oxide and particularly alkylene oxide containing from two to four carbon atoms and thus includes ethylene oxide, propylene oxide and butylene oxide although, when desired, higher molecular weight alkylene oxides may be used including pentylene oxide and hexylene oxide. The particular product will depend upon the specific aminodiphenyl compound, the alkylene oxide, the mole proportions of each and the specific method of reaction which is employed. In general, the alkylene oxide will first react with a hydrogen attached to a primary nitrogen atom and then, when an excess of alkylene oxide is present, will react with a hydrogen attached to a secondary nitrogen atom. Accordingly, when equal mole proportions of alkylene oxide and aminodiphenyl compound are reacted, the product will comprise primarily an oxyalkylenated-aminodiphenyl compound containing one oxyalkylenated group. Similarly, when two mole proportions of alkylene oxide are reacted with a diaminodiphenyl compound, the product will comprise N,N'-di-(oxyalkylenated)-diaminodiphenyl compound. When a catalyst is present the alkylene oxide also will add to the already attached oxyalkylenated group. In the latter instance, two or more oxyalkylenated groups are attached as a single group to the same nitrogen atom. From the above, it will be seen that the product may contain a mixture of oxyalkylenated-aminodiphenyl compounds, but will predominate in the particular product desired.

These reactions are illustrated further by the following general chemical structure:

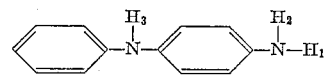

Referring to the above, it will be seen that one oxyalkylenated group may replace the hydrogen labeled $H_1$. When two mole proportions of alkylene oxide per mole of amino nitrogen are employed, it will be seen that both $H_1$ and $H_2$ each may be replaced by one oxyalkylenated group and, when a catalyst is present, that either $H_1$ or $H_2$ (these being equivalent) may be replaced by two or more oxyalkylenated groups attached as a single group. The hydrogen labeled 3 is difficult to replace and, therefore, will not react with the alkylene oxide under normal reaction conditions.

A similar situation prevails in the case of the diaminodiphenylamines as illustrated by the following chemical structure:

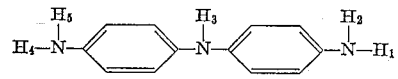

When two mole proportions of alkylene oxide are reacted with one mole proportion of diaminodiphenylamine, $H_1$ and $H_4$ preferentially undergo reaction. When four mole proportions of alkylene oxide are reacted with one mole proportion of the diaminodiphenylamine, $H_1$, $H_2$, $H_4$ and $H_5$ are each replaced with an oxyalkylenated group. These are the predominant reactions, the addition of more than one oxyalkylenated group as a single group occurring when a catalyst is present.

The number of oxyalkylenated groups replacing an amino hydrogen may range from one to twelve or more and will depend upon the ultimate use of the final compound. For example, when the final compound is to be used as an additive to a hydrocarbon substrate, the total number of oxyalkylenated groups preferably is from one to four in order that the additive will be soluble in the hydrocarbon substrate. On the other hand, when the compound is to be used in an aqueous system, the total number of oxyalkylenated groups may range from four to twelve or more.

The oxyalkylenation is readily effected by reacting the aminodiphenyl compound with alkylene oxide and, as hereinbefore set forth, using mole proportions of reactants to produce the desired products. This reaction is effected in any suitable manner and generally at a temperature of from about room temperature (about 22° C.) to about 175° C. and preferably from about 120° to about 150° C. When the oxyalkylenation is to be limited to the addition of one oxyalkylenated group per substitution, the reaction is effected in the absence of a catalyst and, when desired, in the presence of water. When two or more oxyalkylenated groups are to be added as a single group, the reaction is effected in the presence of a catalyst such as sodium hydroxide, potassium hydroxide, tertiary amine and quaternary hydroxide. Superatmospheric pressure may be employed and may range from 10 to 1000 pounds or more. When desired, the reaction may be effected in the presence of a solvent which may be selected from ketones including acetone, methyl ethyl ketone, hydrocarbons including benzene, toluene, xylene, ethyl benzene, cumene, pentane, hexane, heptane, octane, or mixtures containing these and/or other suitable solvents. When a catalyst is not used, the solvent may comprise an alcohol including methyl alcohol, ethyl alcohol, propyl alcohol and butyl alcohol.

Illustrative but not limiting examples of the novel compounds of the present invention include N-oxyethylenated-4-aminodiphenylamine containing one oxyethylenated group, which compound may be named N-2-hydroxyethyl-4-aminodiphenylamine and is prepared by the reaction of ethylene oxide and 4-aminodiphenylamine in equal mole proportions; N-2-hydroxypropyl-4-aminodiphenylamine which is prepared by the reaction of equal mole proportions of propylene oxide and 4-amino-diphenylamine; N-2-hydroxybutyl-4-aminodiphenylamine prepared by the reaction of equal mole proportions of 1,2-butylene oxide with aminodiphenylamine; N-(1-methyl-2-hydroxypropyl)-4-aminodiphenylamine, prepared by the reaction of equal mole proportions of 2,3-butylene oxide with aminodiphenylamine. When two mole proportions of alkylene oxide are reacted with 4-aminodiphenylamine, illustrative but not limiting examples include N,N-di-(2-hydroxyethyl)-4-aminodiphenylamine, N,N-di-(2-hydroxypropyl)-4-aminodiphenylamine and N,N-di-(2-hydroxybutyl)-4-aminodiphenylamine, N,N-di-(1-methyl-2-hydroxypropyl)-4-aminodiphenylamine.

When equal mole proportions of alkylene oxide and 4,4'-diaminodiphenylamine are reacted, illustrative but not limiting examples include 4-(2-hydroxyethyl)-amino-4'-aminodiphenylamine, 4,(2-hydroxypropyl)-amino-4'-aminodiphenylamine, 4-(2-hydroxybutyl)-amino-4'-aminodiphenylamine and 4-(1-methyl-2-hydroxypropyl)-amino-4'-aminodiphenylamine.

Where two mole proportions of alkylene oxide are reacted with one mole proportion of 4,4'-diaminodiphenylamine, illustrative examples include 4,4'-di-(2-hydroxyethylamino)-diphenylamine, 4,4'-di-(2-hydroxypropylamino)-diphenylamine, 4,4'-di-(2-hydroxybutylamino)-diphenylamine and 4,4'-di-(1-methyl-2-hydroxypropylamino)-diphenylamine.

When four mole proportions of alkylene oxide are reacted with one mole proportion of 4,4'-diaminodiphenyl amine, illustrative examples include N,N,N',N'-tetra-(2-hydroxyethyl)-4,4'-diaminodiphenylamine, N,N,N',N'-tetra-(2-hydroxypropyl)-4,4'-diaminodiphenylamine, N,N,N',N'-tetra-(2-hydroxybutyl)-4,4'-diaminodiphenylamine and N,N,N',N'-tetra-(1-methyl-2-hydroxypropyl)-4,4'-diaminodiphenylamine.

When the reaction is effected in the presence of a catalyst and a sufficient excess of alkylene oxide, illustrative examples include N,N-di-[2(2-hydroxyethoxy)-ethyl]-4-aminodiphenylamine, prepared by the reaction of four mole proportions of ethylene oxide with one mole proportion of 4-aminodiphenylamine; N,N-di-[2(2-hydroxypropoxy)-2-methylethyl]-4-aminodiphenylamine, prepared by the reaction of four mole proportions of propylene oxide with one mole proportion of 4-aminodiphenylamine; N,N-di-[2(2-hydroxybutoxy)-butyl]-4-aminophenylamine, prepared by the reaction of four mole proportions of 1,2-butylene oxide with one mole proportion of 4-aminodiphenylamine; N,N,N',N'-tetra-[2(2-hydroxyethoxy)-ethyl]-4,4'-diaminodiphenylamine, prepared by the reaction of eight mole proportions of ethylene oxide with one mole proportion of 4,4'-diaminodiphenyl amine; N,N,N'N'-tetra-[2(2-hydroxypropoxy)-2-methylethyl]-4,4'-diaminodiphenylamine, prepared by the reaction of eight mole proportions of propylene oxide with one mole proportion of 4,4'-diaminodiphenylamine; N,N,N',N'-tetra-[2(2-hydroxybutoxy)-butyl]-4,4'-diaminodiphenylamine, prepared by the reaction of eight mole proportions of 1,2-butylene oxide with one mole proportion of 4,4'-diaminodiphenylamine, and corresponding compounds in which three or more oxyalkylenated groups are attached as a single group or groups.

The specific compounds recited above refer to the N-oxyalkylenated-aminodiphenylamines. Corresponding compounds of the aminodiphenylalkane species include N-2-hydroxyethyl-4-aminodiphenylmethane,
N-2-hydroxypropyl-4-aminodiphenylmethane,
N-2-hydroxybutyl-4-aminodiphenylmethane,
N-(1-methyl-2-hydroxypropyl)-4-aminodiphenylmethane,
N,N-di-(2-hydroxyethyl)-4-aminodiphenylmethane,
N,N-di-(2-hydroxypropyl)-4-aminodiphenylmethane,
N,N-di(2-hydroxybutyl)-4-aminodiphenylmethane,
N,N-di-(1-methyl-2-hydroxypropyl)-4-aminodiphenylmethane,
4-(2-hydroxyethyl)-amino-4'-aminodiphenylmethane,
4-(2-hydroxypropyl)-amino-4'-aminodiphenylmethane,
4-(2-hydroxybutyl)-amino-4'-aminodiphenylmethane,
4-(1-methyl-2-hydroxypropyl)-amino-4'-aminodiphenylmethane,
4,4'-di-(2-hydroxyethylamino)-diphenylmethane,
4,4'-di-(2-hydroxypropylamino)-diphenylmethane,
4,4'-di-(2-hydroxybutylamino)-diphenylmethane,
4,4'-di(1-methyl-2-hydroxypropylamino)-diphenylmethane,
N,N,N',N'-tetra-(2-hydroxyethyl)-4,4'-diaminodiphenylmethane,
N,N,N',N'-tetra-(2-hydroxypropyl)-4,4'-diaminodiphenylmethane,
N,N,N',N'-tetra-(1-methyl-2-hydroxypropyl)-4,4'-diaminodiphenylmethane,
N,N-di-[2(2-hydroxyethoxy)-ethyl]-4-aminodiphenylmethane,
N,N-di-[2(2-hydroxypropoxy)-2-methylethyl]-4-aminodiphenylmethane,
N,N-di-[2(2-hydroxybutoxy)-butyl]-4-aminodiphenylmethane,
N,N,N',N'-tetra-[2(2-hydroxyethoxy)-ethyl]-4,4'-diaminodiphenylmethane,
N,N,N',N'-tetra-[2(2-hydroxypropoxy)-2-methylethyl]-4,4'-diaminodiphenylmethane,
N,N,N',N'-tetra-[2(2-hydroxybutoxy)-butyl]-4,4'-diaminodiphenylmethane, corresponding compounds in which three or more oxyalkylenated groups are attached as a single group or groups, as well as the corresponding ethanes, propanes, butanes, pentanes, hexanes, heptanes, octanes. It is understood that these compounds will be prepared in substantially the same manner as described for the preparation of the aminodiphenylamines, except that the aminodiphenylalkane will be used as a reactant.

Illustrative examples of the aminodiphenyl ethers include

N-2-hydroxyethyl-4-aminodiphenyl ether,
N-2-hydroxypropyl-4-aminodiphenyl ether,
N-2-hydroxybutyl-4-aminodiphenyl ether,
N-(1-methyl-2-hydroxypropyl)-4-aminodiphenyl ether,
N,N-di-(2-hydroxyethyl)-4-aminodiphenyl ether,
N,N-di-(2-hydroxypropyl)-4-aminodiphenyl ether,
N,N-di-(2-hydroxybutyl)-4-aminodiphenyl ether,
N,N-di-(1-methyl-2-hydroxypropyl)-4-aminodiphenyl ether,
4-(2-hydroxyethyl)-amino-4'-aminodiphenyl ether,
4-(2-hydroxypropyl)-amino-4'-aminodiphenyl ether,
4-(2-hydroxybutyl)-amino-4'-aminodiphenyl ether,
4-(1-methyl-2-hydroxypropyl)-amino-4'-aminodiphenyl ether,
4,4'-di-(2-hydroxyethylamino)-diphenyl ether,
4,4'-di-(2-hydroxypropylamino)-diphenyl ether,
4,4'-di-(2-hydroxybutylamino)-diphenyl ether,
4,4'-di-(1-methyl-2-hydroxypropylamino)-diphenyl ether,
N,N,N',N'-tetra-(2-hydroxyethyl)-4,4'-diaminodiphenyl ether,
N,N,N',N'-tetra-(2-hydroxypropyl)-4,4'-diaminodiphenyl ether,
N,N,N',N'-tetra-(2-hydroxybutyl)-4,4'-diaminodiphenyl ether,
N,N,N',N'-tetra-(1-methyl-2-hydroxypropyl)-4,4'-diaminodiphenyl ether,
N,N-di-[2(2-hydroxyethoxy)-ethyl]-4-aminodiphenyl ether,
N,N-di-[2(2-hydroxypropoxy)-2-methylethyl]-aminodiphenyl ether,
N,N-di-[2(2-hydroxybutoxy)-butyl]-aminodiphenyl ether,
N,N,N',N'-tetra-[2(2-hydroxyethoxy)-ethyl]-4,4'-diaminodiphenyl ether,
N,N,N',N'-tetra-[2(2-hydroxypropoxy)-2-methylethyl]-4,4'-diaminodiphenyl ether,
N,N,N',N'-tetra-[2(2-hydroxybutoxy)-butyl]-4,4'-diaminodiphenyl ether, and corresponding compounds in which three or more oxyalkylenated groups are attached as a single group or groups. Here again, it is understood that these compounds will be prepared in substantially the same manner hereinbefore set forth, except that the aminodiphenyl ether will be used as a reactant.

Illustrative examples of compounds prepared from aminodiphenyl sulfides include

N-2-hydroxyethyl-4-aminodiphenyl sulfide,
N-2-hydroxypropyl-4-aminodiphenyl sulfide,
N-2-hydroxybutyl-4-aminodiphenyl sulfide,
N-(1-methyl-2-hydroxypropyl)-4-aminodiphenyl sulfide,
N,N-di-(2-hydroxyethyl)-4-aminodiphenyl sulfide,
N,N-di-(2-hydroxypropyl)-4-aminodiphenyl sulfide,
N,N-di-(2-hydroxybutyl)-4-aminodiphenyl sulfide,
N,N-di-(1-methyl-2-hydroxypropyl)-4-aminodiphenyl sulfide,
4-(2-hydroxyethyl)-amino-4'-aminodiphenyl sulfide,
4-(2-hydroxypropyl)-amino-4'-aminodiphenyl sulfide,
4-(2-hydroxybutyl)-amino-4'-aminodiphenyl sulfide,
4-(1-methyl-2-hydroxypropyl)-amino-4'-aminodiphenyl sulfide,
4,4'-di-(2-hydroxyethylamino)-diphenyl sulfide,
4,4'-di-(2-hydroxypropylamino)-diphenyl sulfide,
4,4'-di-(2-hydroxybutylamino)-diphenyl sulfide,
4,4'-di-(1-methyl-2-hydroxypropylamino)-diphenyl sulfide,
N,N,N',N'-tetra-(2-hydroxyethyl)-4,4'-diaminodiphenyl sulfide,
N,N,N',N'-tetra-(2-hydroxypropyl)-4,4'-diaminodiphenyl sulfide,
N,N,N',N'-tetra-(2-hydroxybutyl)-4,4'-diaminodiphenyl sulfide,
N,N,N',N'-tetra-(1-methyl-2-hydroxypropyl)-4,4'-diaminodiphenyl sulfide,
N,N-di-[2(2-hydroxyethoxy)-ethyl]-4-aminodiphenyl sulfide,
N,N-di-[2(2-hydroxypropoxy)-2-methylethyl]-4-aminodiphenyl sulfide,
N,N-di-[2(2-hydroxybutoxy)-butyl]-4-aminodiphenyl sulfide,
N,N,N',N'-tetra-[2(2-hydroxyethoxy)-ethyl]-4,4'-diaminodiphenyl sulfide,
N,N,N',N'-tetra-[2(2-hydroxypropoxy)-2-methylethyl]-4,4'-diaminodiphenyl sulfide,
N,N,N',N'-tetra-[2(2-hydroxybutoxy)-butyl]-4,4'-diaminodiphenyl sulfide, and corresponding compounds in which three or more oxyalkylenated groups are attached as a single group or groups. Here again, it is understood that these compounds will be prepared in substantially the same manner hereinbefore set forth, except that the aminodiphenyl sulfide will be used as a reactant.

In the interest of simplicity, the specific compounds recited above are all limited to the reaction products obtained from the 4-aminodiphenyl compound or the 4,4'-diaminodiphenyl compound. It is understood that the 2- or 3-aminodiphenyl compound or 2,2'-, 2,3'-, 2,4'-, 3,3'-, or 3,4'-diaminodiphenyl compounds, or mixtures thereof, may be oxyalkylenated in the same manner as hereinbefore set forth to form compounds and mixtures containing the oxyalkylenated groups specifically set forth above.

From the above description, it will be seen that the oxyalkylenated-aminodiphenyl compounds of the present invention will vary with the particular method of manufacture as hereinbefore set forth. It also will be noted that these oxyalkylenated products include hydroxyalkyl and/or hydroxyalkoxy alkyl substitutions. Accordingly, these compounds are best described by the method of manufacture rather than to limit them unnecessarily to the compounds of one particular class.

As hereinbefore set forth, in most if not all cases, the products of the oxyalkylenation will comprise a mixture including or predominating in one of the compounds specifically recited above, but also containing one or more of the other compounds specifically set forth above. In general, the reaction effected in the absence of a catalyst is more selective and will predominate in a particular compound. However, the reaction effected in the presence of a catalyst is not as selective and accordingly will contain a mixture of compounds in practically all cases. When desired, the mixture of products may be treated in any suitable manner to separate a particular compound from the mixture.

It is understood that the different products of the present invention are not necessarily equivalent in their activity as additives in a particular organic substance. However, all of these products will be of use in one or more different applications.

When used as an inhibitor in an organic substance, the product of the present invention is used in a concentration of from about 0.0001% to about 10% by weight or more of the organic substance, although in some cases higher or lower concentrations may be employed. The exact concentration to be used will depend upon the particular organic substance being treated. In most cases, concentrations of from about 0.001% to about 5% by weight will be employed.

It is understood that the products of the present invention may be used along with other additives incorporated in the organic substance. For example, in grease the inhibitor may be used along with higher alcohols, esters, organic amines, polybutene, sulfurized fatty materials, sulfur chlorine compounds, molybdenum disulfide, dyes, perfumed materials and fillers. In lubricating oil, the product may be used along with one or more of the above additives and/or viscosity index improver, pourpoint depressor, anti-foaming agent, detergent, lubricity or extreme pressure additive. In polymers, such as polyolefins, the inhibitor is used along with one or more of dyes and/or pigments, antistatic agents, plasticizers, ultraviolet light stabilizers. In some cases, it may be of advantage to also include a metal deactivator as, for example, disalicylal diamino propane, ethylene diamine tetraacetic acid tetrasodium salt, or to include other additives such as tricresyl phosphate, trialkyl phenols including 2,6-di-tert-butyl-4-methylphenol, 2,4-dimethyl-6-tert-butylphenol, alkylated diphenyl amines, phenyl naphthyl amines, dialkyl phenylene diamines, phenothiazine and organic selenium compounds. When desired, the product of the present invention may be prepared as a mixture with one or more of these other additives and incorporated in this manner in the organic substance.

Also, it is understood that the product of the present invention may be prepared as a solution in a suitable solvent including hydrocarbons, alcohols and ketones. In some cases, the same solvent used for the inhibitor of the present invention may be used for one or more of the other additives to be incorporated in the organic substance. In another method, the inhibitor of the present invention may be prepared as a stock solution in a small quantity of the organic substance and the stock solution then is incorporated into the major quantity of the organic substance.

The product of the present invention may be incorporated in the organic substance in any suitable manner and at any suitable stage of preparation. For example, in an organic substance which comprises a mixture of several components as, for example, grease, the product may be added to one or more of the components of the grease prior to compositing and processing thereof, or it may be added to the mix at any time, preferably before final processing in order to obtain intimate mixing and dissolving of the inhibitor in the grease.

The following examples are introduced to illustrate further the novelty and utility of the present invention but not with the intention of unduly limiting the same.

*Example I*

This preparation comprises predominantly N,N-di-(2-hydroxyethyl)-4-aminodiphenylamine and was prepared by the condensation of two mole proportions of ethylene oxide with one mole proportion of 4-aminodiphenylamine. Specifically, 92 g. (0.5 mole) of 4-aminodiphenylamine were reacted with 44 g. (1 mole) of ethylene oxide in a rotating autoclave at 150° C. for four hours. The product was recovered as a solid having a melting point of 131–133° C. The product was analyzed and found to contain 5% by weight of nitrogen which corresponds to the theoretical nitrogen content of 5.1%. The equivalent weight was 278.5 which corresponds to the theoretical equivalent weight of 272.

*Example II*

The product of this example predominates in N,N,N',N' - tetra-(2-hydroxyethyl)-4,4'-diaminodiphenylmethane and was prepared by the reaction of 44 g. (1 mole) of ethylene oxide with 40 g. (0.2 mole) of 4,4'-diaminodiphenylmethane. The reaction was effected at 125° C. for three hours in a rotating autoclave.

*Example III*

The compound of this example predominates in N,N'-di-(2-hydroxypropyl)-4,4'-diaminodiphenylmethane and was prepared by the reaction of 23 g. (0.4 mole) of propylene oxide with 40 g. (0.2 mole) of 4,4'-diaminodiphenylmethane. The reaction was effected at 100° C. in a rotating bomb for three hours. After completion of the reaction, the product was washed in 200 cc. of benzene and the benzene solvent was removed by distillation.

*Example IV*

The preparation of this example predominates in N,N,N',N' - tetra - (2-hydroxypropyl)-4,4'-diaminodiphenylmethane and was prepared by the reaction of 40 g. (0.2 mole) of 4,4'-diaminodiphenylmethane with 58 g. (1.0 mole) of propylene oxide. The reaction was effected at 125° C. in a rotating autoclave. The reaction product was recovered as a solid and was crystallized from benzene to yield a solid product having a melting point of 148–150° C. and a nitrogen equivalent of 435, which corresponds to the theoretical nitrogen equivalent of 428.

*Example V*

N,N-di-(2-hydroxyethyl)-4-aminodiphenylethane is prepared by the reaction of two moles of ethylene oxide with one mole of 4-aminodiphenylethane. The reaction is effected at 135° C. in a rotating autoclave.

*Example VI*

N,N'-di-(2-hydroxypropyl)-2,4'-diaminodiphenyl ether is prepared by the reaction of propylene oxide with 2,4'-diaminodiphenyl ether. This reaction is effected using two mole proportions of propylene oxide and one mole proportion of 2,4'-diaminodiphenyl ether. The reactants are heated in a stirred reaction chamber to a temperature of 125° C. for four hours.

*Example VII*

N,N,N',N' - tetra - (2-hydroxyethyl)-4,4'-diaminodiphenyl sulfide is prepared by reacting four mole proportions of ethylene oxide with one mole proportion of 4,4'-diaminodiphenyl sulfide at 140° C. for five hours in a closed reactor equipped with stirring means.

*Example VIII*

N,N-di-(2-hydroxyethyl)-4-aminodiphenylamine, prepared as described in Example I, was evaluated as an antioxidant in polyethylene. The polyethylene used in this example is of high density and is marketed under the trade name of "Fortiflex." In the sample containing inhibitor, the inhibitor was used in a concentration of 0.075% by weight of the polyethylene and was incorporated therein by milling. The samples of polyethylene were evaluated in a method similar to that described by Hawkins, Hansen, Matreyek and Winslow in Rubber Chemistry and Technology, October–November 1959, pages 1164–1170, except that an electrically heated aluminum block rather than an oven was used to maintain the desired temperature. The oxygen absorption of the sample was determined manometrically rather than volumetrically. In this method, samples of the polyethylene weighing about 0.5 g. are placed in separate 8 mm. glass tubes and the tubes then are inserted into horizontal rows of openings located concentrically around the heater. The temperature is maintained at about 140° C. The glass tubing also is packed with glass wool and molecular sieves to absorb the gases. Each of the glass tubes is connected to individual manometers containing mercury and the differential pressure is periodically determined. The Induction Period is taken as the number of hours required to reach a pressure differential of 20 cm. Hg.

The following table reports the results of a sample of polyethylene without inhibitor and a sample of the polyethylene containing N,N-di-(2-hydroxyethyl)-4-aminodiphenylamine.

TABLE I

| Inhibitor: | Induction Period hours to ΔP of 20 cm. Hg |
|---|---|
| None | 8 |
| N,N-di-(2-hydroxyethyl)-4-aminodiphenyl amine | 317 |

From the data in the above table, it will be seen that the inhibitor of the present invention was effective in extending the Induction Period of the polyethylene.

*Example IX*

N,N,N',N' - tetra - (2-hydroxypropyl)-4,4'-diaminodiphenylmethane, prepared as described in Example IV, was used as an inhibitor in grease. The grease was a lithium grease and was prepared by mixing 91% by weight of highly refined petroleum lubricating oil with 8% by weight of lithium stearate. The mixture was heated at about 232° C. while agitating the same. Subsequently the grease was cooled, while agitating to 160° C. and, at this temperature, 0.3% by weight of the inhibitor was added. Agitation was continued, and the mixture was allowed to cool to about 120° C. and the grease then was further cooled slowly to room temperature.

The stability of the grease was tested according to a modified Norma Hoffman method, in which a sample of the grease is placed in a bomb and oxygen is charged thereto. The bomb then was heated to 100° C. and the time required for a drop of 5 pounds pressure is taken as the Induction Period.

When evaluated in the above manner, a sample of the grease without inhibitor had an Induction Period of 6 hours. The sample of the grease containing 0.3% by weight of N,N,N',N'-tetra-(2-hydroxypropyl)-4,4'-diaminodiphenylmethane had an Induction Period of 210 hours.

*Example X*

The preparation of Example III also was used as an inhibitor in grease in substantially the same manner described in Example IX. The grease containing 0.3% by weight of this inhibitor had an Induction Period of 180 hours.

*Example XI*

N,N-di-(2-hydroxyethyl)-2,4'-diaminodiphenyl ether, prepared by the reaction of two mole proportions of ethylene oxide with one mole proportion of 2,4'-diaminodiphenyl ether, is used as an inhibitor in dioctyl sebacate marketed under the trade name of "Plexol 201." This synthetic lubricating oil is being used commercially on a comparatively large scale.

The lubricating oil is evaluated in accordance with a standard Oxygen Stability Test, in which a 100 cc. sample of the lubricating oil is placed in a bath maintained at 204° C. and air is blown therethrough at a rate of 5 liters of air per hour. The sample of lubricating is examined periodically and the time to reach an acid number of 5 is reported. It is apparent that the longer the time required to reach an acid number of 5, the more stable is the sample of lubricating oil. In other words, it takes longer for the more stable oil to deteriorate.

A sample of the dioctyl sebacate, when evaluated in the Oxygen Stability Test described above, develops an acid number of 5 within 9 hours. Incorporation of 1% by weight of the inhibitor of this example into the dioctyl sebacate increases by more than tenfold the time to reach an acid number of 5.

*Example XII*

The preparation of this example contains N,N-di-[2(2-hydroxyethoxy)-ethyl]-4-aminodiphenylamine and is prepared by the reaction of four mole proportions of ethylene oxide with one mole proportion of 4-aminodiphenylamine in the presence of a catalyst. The product, either as such or after fractionation, is used in a concentration of 1% by weight as an inhibitor in another sample of the grease described in Example IX. The inhibitor is incorporated into the grease in the same manner described in Example IX and is evaluated according to the modified Norma Hoffman method described therein.

We claim as our invention:

1. An N, oxyalkenylated-aminodiphenyl compound having the general formula:

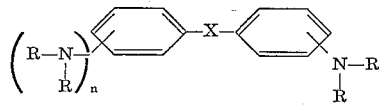

in which X is selected from the group consisting of oxygen and nitrogen, R is selected from the group consisting of hydrogen, hydroxyalkyl, hydroxyalkoxyalkyl or mixtures thereof, at least one R being hydroxyalkyl or hydroxyalkoxyalkyl, where the hydroxyalkyl contains from 2 to 6 carbon atoms and the hydroxyalkoxyalkyl contains from 4 to 12 carbon atoms, and N is an integer of from 0 to 1.

2. N,N' - di - (hydroxyethyl) - diaminodiphenylamine.
3. N,N,N',N' - tetra - (2 - hydroxyethyl) - 4,4' - diaminodiphenylamine.
4. N,N' - di - (2 - hydroxyethyl) - 2,4' - diaminodiphenyl ether.

References Cited by the Examiner
UNITED STATES PATENTS 2,290,860  7/1942  Burk et al. _____ 260—570 XR
3,113,124  12/1963 Popoff et al. _____ 260—573 XR

FOREIGN PATENTS 1,060,140  6/1959  Germany.
910,333    11/1962 Great Britain.

OTHER REFERENCES

Lecocq, "Bull. Soc. Chim. France," 1950, pages 188-92.

CHARLES B. PARKER, *Primary Examiner.*
R. V. HINES, *Assistant Examiner.*